UNITED STATES PATENT OFFICE.

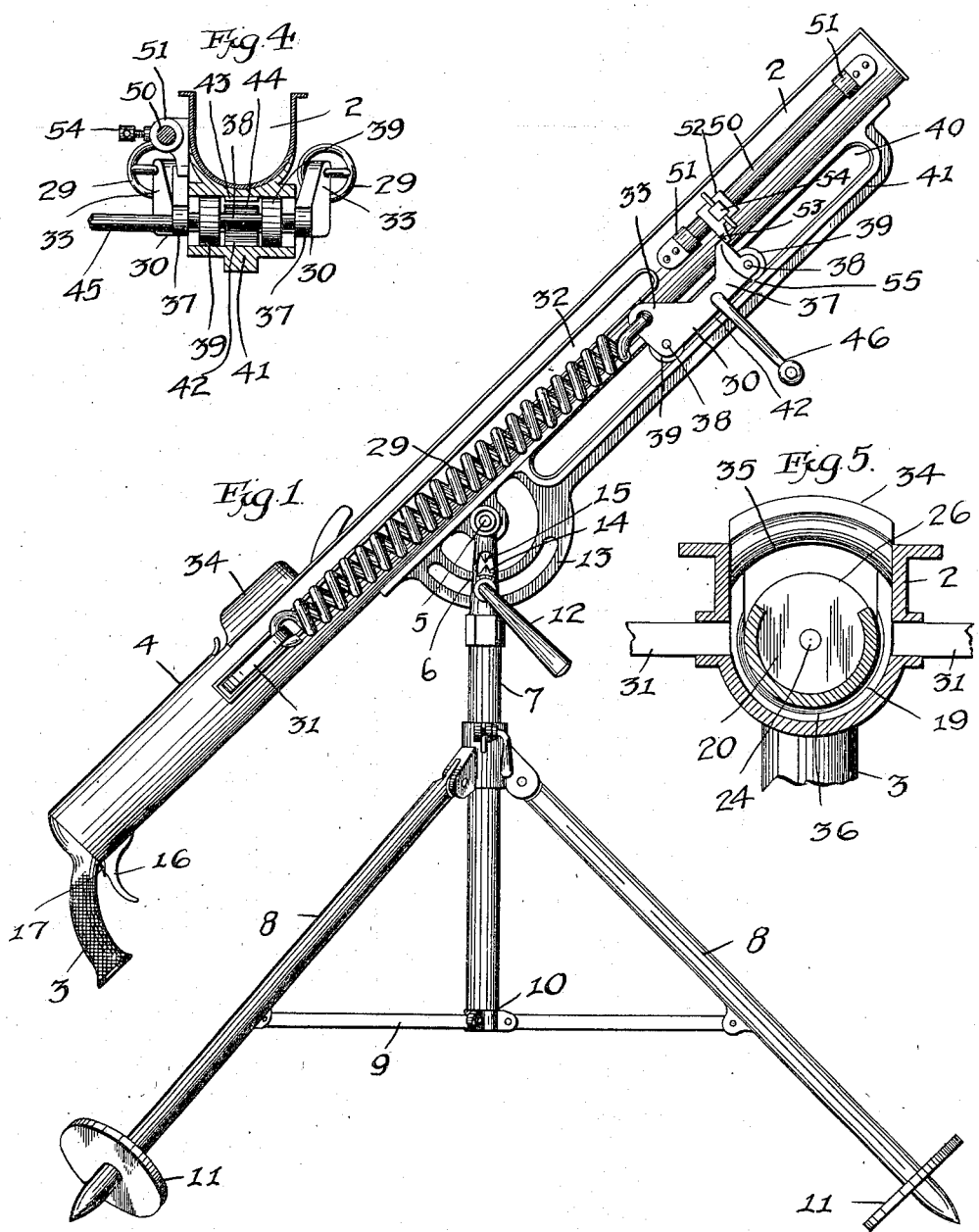

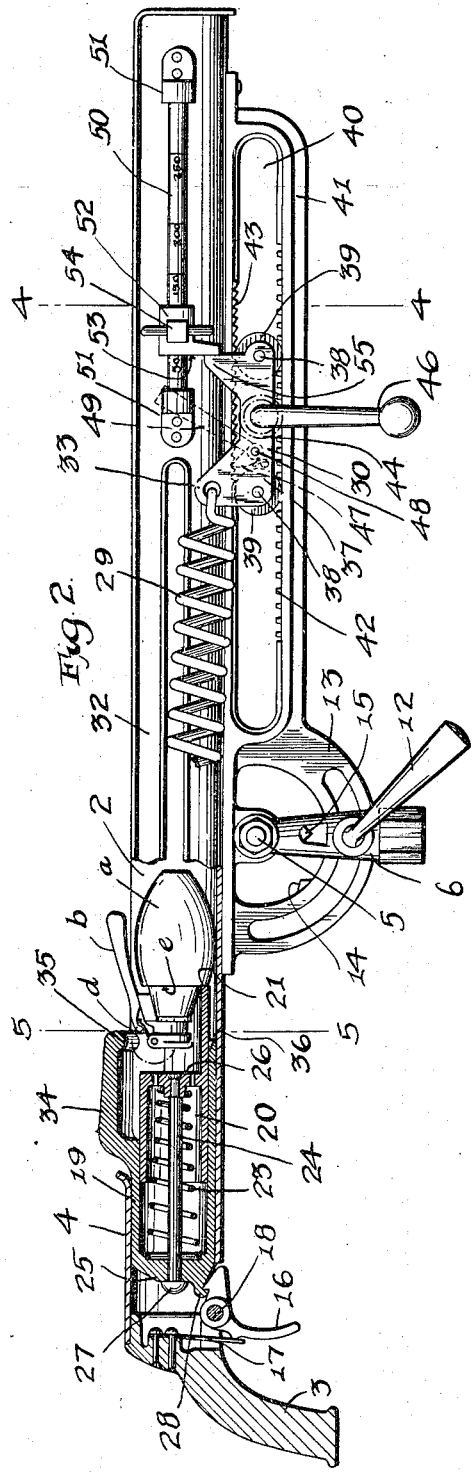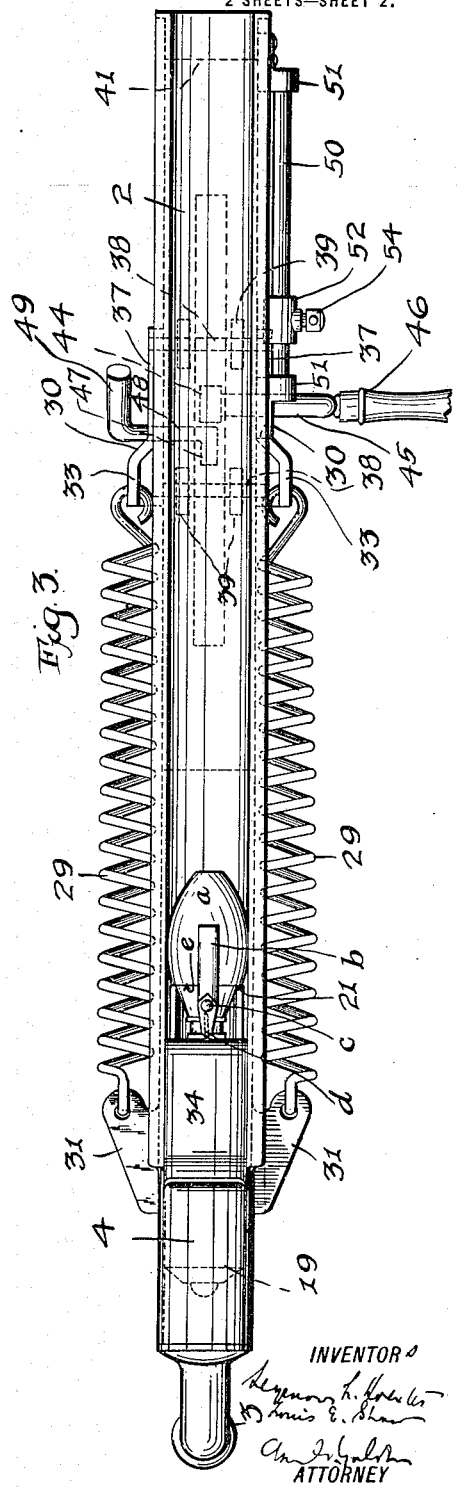

SEYMOUR L. HOEXTER AND LOUIS E. SHAW, OF NEW YORK, N. Y.; SAID SHAW ASSIGNOR TO SAID HOEXTER.

APPARATUS FOR THROWING GRENADES.

1,270,293.         Specification of Letters Patent.     Patented June 25, 1918.

Application filed February 19, 1918. Serial No. 218,035.

*To all whom it may concern:*

Be it known that we, SEYMOUR L. HOEXTER, a citizen of the United States, and a resident of the city, county, and State of New York, and LOUIS E. SHAW, a citizen of the United States, and a resident of the city, county, and State of New York, have invented a new and useful Improvement in an Apparatus for Throwing Grenades, of which the following is a specification.

The object of the invention is to provide an effective and reliable trench apparatus for throwing bombs, particularly hand grenades of the regulation type having a lateral lever which must be compressed immediately before launching in order to release the striker of the time fuse mechanism.

In the accompanying drawings forming a part of this specification:

Figure 1 is a side elevation of the grenade thrower in condition for use;

Fig. 2 is a side elevation, partly in section, the structure being removed from its stand and in horizontal position;

Fig. 3 is a plan view of Fig. 2;

Fig. 4 is a cross-section on the line 4—4 of Fig. 2; and

Fig. 5 is a cross-section on the line 5—5 of Fig. 2.

The apparatus has a trough or guide 2, which is open at the front end, closed at the rear end and provided with a piston grip 3. The trough may be covered at the rear, as shown at 4. Its lateral and vertical dimensions are such as to receive a hand grenade *a* of known construction. These grenades have each a releasing lever *b* which lies along the side of the bomb, to which it is connected by a rivet *c* constituting a normally unyielding pivot or fulcrum, which if the grenade is hurled manually is forced by compression in the hand preparatory to or in the fact of throwing. When so actuated the lever releases a pivoted, spring-urged striker *d*, which fires the time-fuse mechanism (not shown) at that end of the grenade which in this apparatus is disposed toward the rear of the trough.

The trough is pivotally mounted at the bottom and intermediate its ends upon a transverse pin 5 carried by a ferrule 6, which is mounted upon the upper end of the staff 7 of a tripod having folding legs 8 connected by braces 9 radiating from a collar 10 slidable on the staff. The legs may be equipped slightly above their lower ends with guard disks 11 which prevent the legs sinking too far into the ground and insure an even and firm support.

The trough is locked at the correct elevation by a lever clamp 12 coöperating with a slotted segment 13 projecting downward from the trough around the pivot 5 and working through the ferrule 6. A pointer 14 on and movable with the segment about the pivot 5 and a coöperating pointer 15 on the ferrule indicate by their coincidence a fixed or determined elevation.

A trigger catch 16 pressed by a spring 17 is pivoted at 18 close in advance of the grip 3 and serves to retain and release a telescopic spring-driven structure, which will now be described. The said structure comprises an outer hollow member 19 slidably fitting the trough, and an inner hollow member 20 slidably fitting a bearing in the interior of the member 19. The member 20 normally projects ahead of the member 19 as seen in the views, this forward portion of the member 20 being cut away at the top (see Fig. 5) so that its end forms a segmental shoulder 21, preferably greater than a half circumference. Against this shoulder as an abutment the grenade is placed rearwardly, the grenade being provided toward the rear with an encircling shoulder *e* coöperative with the abutment shoulder.

In the normal condition the abutment member 20 is held projected a definite distance in advance of the member 19 by an expansion spring 23 acting against limit-stop means in the form of a tension rod 24. The said spring is housed in a barrel formed by the portions of the interiors of the two members included between a rear end wall 25 on the member 19 and an intermediate transverse wall 26 on the member 20. The rod 24 is secured at its forward end in the wall 26 and passes slidably through an opening in the back wall 25, in rear of which it is provided with a head 27. The spring 23 separates or extends the two members up to the limit determined by the contact of the head 27 with the wall 25, and this determines an exact position of the abutment shoulder 21, when the parts are caught at the rear of the barrel as represented in the drawing.

The rear member 19 is provided at the back with a catch lug 28, which engages with the pivoted catch 16, and when so held is strongly urged in the forward direction by a pair of tension springs 29 extending forward at each side of the trough to a carriage 30, to which they are secured. The rear ends of these springs are connected to ears 31 projecting laterally from the member 19 through longitudinally extending slots 32 in the sides of the trough, and their forward ends are connected to other ears 33 projecting upward from the two lateral portions of the carriage.

The member 19 is formed with an upwardly or outwardly offset forward portion or limb 34, which terminates at the front end in an inwardly projecting rounded segmental lip or riding surface 35, which is located at the region of the cut-away top of the forward part of the member 20, and the function of which is to ride upon the inclined lever $b$ of the grenade in advance of the rigid fulcrum $c$, so as to force this lever by a camming action, thus releasing the striker $d$. Enough room, it will be observed, is left between the rear end of the grenade and the wall 26 and beneath the limb 34 for the striker to operate freely therein.

At this point it should be explained that the spring 23 is materially weaker than the springs 29, so that, owing to the inertia of the forward member 20 and of the grenade, these elements remain stationary for a brief interval as the member 19 advances following the pulling of the trigger. The grenade may not be moved until it is struck by the forward edge 36 of the member 19, which is shown internally beveled to conform to the swelling surface of the grenade just in advance of the shoulder $e$, or it may be given a cushioned start, owing to the increasing compression of the spring 23 causing the abutment member 20 to take up the movement slightly before the edge 36 of the member 19 would strike the grenade. In any event the driving mechanism operates with an initial period of lost-motion, which is employed in compressing the lever $b$, through the action of the lip 35, and thus causing the ignition of the time-fuse.

The carriage 30 comprises two side plates 37 suitably connected and bearing the axles 38 of front and rear pairs of rollers 39, which travel in the slotted way 40 of a guide 41 secured beneath the forward part of the trough. The rollers 39 are disposed at opposite sides of a rack 42 formed upon the bottom of the guideway and of a series of ratchet teeth 43 above. A pinion 44 meshes with the rack and is fixed upon a shaft 45, which is journaled in the plates of the carriage and extended at one side to bear a crank-handle 46. By this power means the carriage may be advanced to tension the driving springs. A spring-pressed holding dog 47 on the carriage clicks along the ratchet teeth 43 as the carriage moves forward, thus preventing retrograde movement. The said dog is fixed on a shaft 48 having a handle 49 whereby it may be disengaged from the ratchet teeth to permit the carriage to be shifted rearward.

An indicator is provided in conjunction with the power-operated spring-tensioning mechanism to indicate different degrees of spring tension, or different ranges corresponding to such tensions with a fixed elevation of the trough. This indicator is preferably in the nature of a shiftable abutment or stop, which when once set in accordance with suitable graduations requires no further attention until the range is to be changed, since the mere stoppage of the carriage 30 apprises the operator when the springs have been sufficiently tensioned. Accordingly a longitudinally extending rod 50 is mounted in end brackets 51 upon one exterior side of the trough, which rod is graduated in figures representing yards or other units of distance. Upon this rod is a slidable carriage 52 having a rearwardly disposed abutment face 53 and carrying a clamp screw 54 by which it may be locked at any point on the rod. An upward extending projection 55 on one of the side plates of the carriage 30 constitutes the coöperating movable stop whereby the carriage 30 is brought to rest when the two stops meet as seen in the drawing.

The operation and mode of use of the apparatus will now be described. Let it be assumed that the thrower has been discharged. The positioning, releasing and driving structure 19, 20 will then be located somewhere in front of the caught or cocked position shown in the drawings, and the springs 29 will be relaxed. These springs are too powerful to permit of the member 19 being drawn back by hand were their forward ends fixed. Accordingly the operator trips the holding dog 47 by means of its handle 49 and winds the carriage 30 backward by means of the crank 46 and the pinion 44 operating on the rack 42. The members 19 and 20 are now easily moved to the rear end of the trough, where the member 19 is automatically engaged and held by the trigger catch 16. The abutment member 20 is automatically held at the proper forward distance or degree of extension by means of the yielding spring 23 acting in coöperation with the rod 24 or equivalent limiting means. The operator then winds the carriage 30 forward again until the traveling stop 55 meets the fixed though adjustable stop 53, when the driving springs 29 are known to be sufficiently tensioned. The dog 47 automatically holds the carriage at this point and preserves the tension on the springs until such time as the trigger is pulled. A grenade *a* is now placed in the trough with its lever *b* at the top and slid rearward until its shoulder *e* contacts with the shoulder 21 formed by the forward edge of the member 20. If now the trigger catch 16 be disengaged from the catch lug on the member 19, the first effect of the driving springs acting upon this member is to cause it to slide forward on the rod 24 compressing the spring 23, the member 20 and the grenade *a* remaining stationary or substantially stationary meanwhile. In this way the lip 35 is caused to slide forcibly along the inclined releasing lever *b*, rocking the same and freeing the striker *d* to perform its duty. Now either the forward end 36 of the member 19 strikes against the grenade, or else the compression of the spring 23 becomes sufficient to cause the member 20 to move the grenade. In either case the driving and abutment members 19 and 20 and the grenade now travel forward together at a high rate of speed, with the time-fuse of the bomb burning, and the bomb is discharged from the end of the trough while the members 19, 20 come to rest. The direction of the driving springs, it may be noted, is slightly downward so as to cause the telescopic driving structure to hug the bottom of the trough as it shoots forward, thus guarding against upward displacement. Any possibility of the members driving beneath the bomb and throwing it upward out of the top of the trough is defeated by the manner in which they encircle the rear part of the grenade while propelling it.

In conclusion it may be observed that while the preferred embodiment of the apparatus has been described in detail, there may be changes in form, proportion and arrangement and substitutions of equivalents without departing from the scope of the claims.

What we claim as new is:

1. A grenade thrower comprising a trough and spring-operated driving means having means for compressing a lateral releasing lever on a grenade placed in the rear of the trough.

2. A grenade thrower comprising a trough, spring-operated driving means organized to operate with initial lost motion, and means operated by the driving means for compressing a lateral releasing lever on a grenade placed in the rear of the trough during such interval of lost motion.

3. A grenade thrower comprising a trough, spring-operated driving means, a movable abutment having lost-motion connection with the driving means, and means operated by the driving means for compressing a lateral releasing lever on a grenade placed rearwardly against the abutment.

4. A grenade thrower comprising a trough, a spring-operated driver having means thereon for compressing a lateral releasing lever on a grenade placed in the rear of the trough, and an abutment located forwardly of the driver and having lost-motion connection therewith.

5. A grenade thrower comprising a trough, spring-operated driving means, an abutment movable by and with the driving means, a spring-yielding connection between the driving means and abutment, and means operated by the driving means for compressing a lateral releasing lever on a grenade placed rearward against the abutment.

6. A grenade thrower comprising a trough, telescopic members therein, driving springs coöperative with the rear member, and a spring-yielding connection between the members.

7. A grenade thrower comprising a trough, longitudinally movable members against the forward of which a grenade is placed, driving springs coöperative with the other member, a trigger catch, and a yielding spring and a limit coupling between the members.

8. A grenade thrower comprising a trough, longitudinally movable members against the forward of which a grenade is placed, the other member having an inwardly presented riding surface to compress a laterally disposed releasing lever on the grenade, driving springs coöperative with this member, a trigger catch, and a yielding spring and a limit coupling between the members.

9. A grenade thrower comprising a trough, telescopic members therein, the inner member normally projecting forwardly of the outer member to provide an abutment against which to place a grenade, the outer member having a lip to ride upon and compress a lateral releasing lever on the grenade, driving springs coöperative with the outer member, a trigger catch, and a spring-yielding connection between the members.

10. A grenade thrower comprising a trough, a tubular driver adapted to have encircling driving engagement with a grenade and having a lip to ride upon and compress a lateral releasing lever thereon, an abutment normally projected forward from the driver, a spring-yielding connection between the driver and abutment, driving springs coöperative with the driver, and a trigger catch for releasing the driving springs.

11. A grenade thrower comprising a trough, telescopic members therein, one of said members having a segmental abutment and normally projecting forwardly of the other, said other member having a lip at the region of the cut-away portion of said abutment end to ride upon and compress a laterally disposed releasing lever on a grenade placed against the abutment end, driving springs coöperative with the latter member, and a spring-yielding connection between them.

12. A grenade thrower comprising a trough, telescopic members therein, a spring-yielding lost-motion connection between the members whereby the inner member is normally maintained projected a definite distance in advance of the outer member, said inner member having a segmental abutment end, the outer member having an outwardly offset limb terminating in an inwardly projecting lip at the cut-away region of said abutment end to ride upon and compress a lateral releasing lever on a grenade placed against the abutment, and driving springs coöperative with the outer member.

13. A grenade thrower comprising a trough, a driver, driving springs, a trigger catch for releasing the driving springs, and means for variably tensioning the same.

14. A grenade thrower comprising a trough, a driver, driving springs, and gear-operated means for extending said springs.

15. A grenade thrower comprising a trough, a driver, tension driving springs, a carriage on the trough connected with the forward ends of the springs, power mechanism for advancing the carriage, means for holding the carriage against retrograde movement, and an indicator coöperative therewith.

16. A grenade thrower comprising a trough, a driver, tension driving springs extending forward therefrom, a guide beneath the forward part of the trough, a carriage movable lengthwise in said guide, power means for advancing the carriage, means for holding the same against retrograde movement, and an indicator coöperative therewith.

17. A grenade thrower comprising a trough, a driver, driving springs, a carriage on the trough connected with the forward ends of the springs, power mechanism for advancing the carriage, means for holding the carriage against retrograde movement, a graduated slide, and an indicator abutment on said slide coöperative with the carriage.

18. A grenade thrower comprising a trough, a driver, tension driving springs extending forward therefrom, a slotted guide on the forward part of the trough having a rack, a carriage slidable in the guide and having a crank-operated pinion meshing with the rack, and a holding dog.

19. A grenade thrower comprising a trough, a stand, a pivotal connection between the trough and stand, means for indicating a fixed elevation, driving springs, and means for variably tensioning said springs.

Dated this 9th day of February, 1918.

SEYMOUR L. HOEXTER.
LOUIS E. SHAW

Witnesses:
R. H. EMPY,
EMIL N. BAAR.